US011905216B2

(12) United States Patent
Koszo et al.

(10) Patent No.: US 11,905,216 B2
(45) Date of Patent: Feb. 20, 2024

(54) PROCESS FOR MAKING A CERAMIC PARTICULATE MIXTURE

(71) Applicant: VECOR IP HOLDINGS LIMITED, Kowloon (HK)

(72) Inventors: Sandor Koszo, Shandong (CN); Bo Wei Ma, Shandong (CN); Ahmad Badran, Shandong (CN)

(73) Assignee: Vecor IP Holdings Limited, Hong Kong (HK)

( * ) Notice: Subject to any disclaimer, the term of this patent is extended or adjusted under 35 U.S.C. 154(b) by 551 days.

(21) Appl. No.: 17/285,301

(22) PCT Filed: Oct. 15, 2019

(86) PCT No.: PCT/EP2019/078014
§ 371 (c)(1),
(2) Date: Apr. 14, 2021

(87) PCT Pub. No.: WO2020/079029
PCT Pub. Date: Apr. 23, 2020

(65) Prior Publication Data
US 2021/0323871 A1 Oct. 21, 2021

(30) Foreign Application Priority Data
Oct. 15, 2018 (EP) .................................. 18200339

(51) Int. Cl.
| | | |
|---|---|---|
| *C04B 33/132* | (2006.01) | |
| *C04B 35/626* | (2006.01) | |
| *B01J 2/00* | (2006.01) | |
| *B01J 2/22* | (2006.01) | |
| *B07B 4/02* | (2006.01) | |
| *B07B 9/02* | (2006.01) | |
| *C04B 33/04* | (2006.01) | |
| *B01J 8/00* | (2006.01) | |

(52) U.S. Cl.
CPC ............. *C04B 33/1324* (2013.01); *B01J 2/22* (2013.01); *B07B 4/02* (2013.01); *B07B 9/02* (2013.01); *C04B 33/04* (2013.01); *C04B 35/6261* (2013.01); *C04B 35/62695* (2013.01); *B01J 2/00* (2013.01); *B01J 8/005* (2013.01); *C04B 2235/349* (2013.01); *C04B 2235/3463* (2013.01); *C04B 2235/5427* (2013.01); *C04B 2235/5436* (2013.01); *C04B 2235/77* (2013.01)

(58) Field of Classification Search
CPC .... B01J 2/20; B01J 2/22; C04B 33/04; C04B 33/1324; C04B 35/6261; C04B 35/62695; C04B 2235/3463; C04B 2235/349; C04B 2235/5427; C04B 2235/5436; C04B 2235/77
See application file for complete search history.

(56) References Cited

U.S. PATENT DOCUMENTS

| | | | |
|---|---|---|---|
| 5,028,569 A | 7/1991 | Cihon | |
| 2007/0059528 A1 | 3/2007 | Palamara et al. | |
| 2013/0248625 A1* | 9/2013 | Arnau Villanova | ....... B01J 2/10 241/62 |
| 2016/0053162 A1 | 2/2016 | Marchwicki | |

FOREIGN PATENT DOCUMENTS

| | | |
|---|---|---|
| CN | 101705076 A | 5/2010 |
| CN | 105312136 A | 2/2016 |
| CN | 108046752 A | 5/2018 |

OTHER PUBLICATIONS

European Search Report for European Application No. 18200339.2, dated Apr. 8, 2019, 11 pages.
International Search Report and Written Opinion for International Application PCT/EP2019/078014, dated Feb. 4, 2020, 15 pages.
Spary et al., "Particle Size Classification of Ceramic Powders", 75th Annual Meeting and Exposition of the American Ceramic Society, 2019, vol. 52, No. 1, p. 394.

* cited by examiner

*Primary Examiner* — Mary Lynn F Theisen
(74) *Attorney, Agent, or Firm* — RatnerPrestia

(57) ABSTRACT

The present invention relates to a non-spray-drying, dry-granulation process for making a ceramic particulate mixture comprising from 4 wt % to 9 wt % water, wherein at least 90 wt % of the particles have a particle size of from 80 µm to 600 µm, wherein the process comprises the steps of:
(a) forming a precursor material;
(b) subjecting the precursor material to a compaction step to form a compacted precursor material;
(c) subjecting the compacted precursor material to a crushing step to form a crushed precursor material; and
(d) subjecting the crushed precursor material to at least two air classification steps, wherein one air classification step removes at least a portion of the particles having a particle size of greater than 600 µm from the crushed precursor material, and wherein the other air classification step removes at least a portion of the particles having a particle size of less than 80 µm from the crushed precursor material.

11 Claims, No Drawings

PROCESS FOR MAKING A CERAMIC PARTICULATE MIXTURE

CROSS-REFERENCE TO RELATED APPLICATIONS

This application is the U.S. National Phase Application filed under 35 U.S.C. § 371 claiming benefit to PCT International Patent Application No. PCT/EP2019/078014, filed Oct. 15, 2019, which claims priority to European Application No. EP18200339.2, filed Oct. 15, 2018, each of which application is hereby incorporated herein by reference in its entirety.

FIELD OF THE INVENTION

The present invention relates to a process for making the ceramic particulate mixtures. The process is efficient, environmentally friendly, and avoids the need for a spray-drying step whilst producing ceramic particulate mixtures having good physical properties, such as flowability. The resultant ceramic particulate mixtures can be used in ceramic production processes, such as ceramic tile production processes. The process is efficient (especially energy efficient), environmentally friendly, and avoids the need for a spray-drying step whilst producing ceramic particulate mixtures having good physical properties, such as flowability, and which are suited for the production of high-quality ceramic articles such as floor tiles, especially porcelain floor tiles.

BACKGROUND OF THE INVENTION

Many ceramic articles, such as tiles, are now manufactured from ceramic particulate mixtures that are prepared by spray drying. In such spray-drying processes, ceramic raw ingredients such as clays and/or feldspars, are formed in aqueous slurries and then spray dried to form the ceramic particulate mixture. The particles are then pressed together under high pressure to form a green article. This green article is then subjected to firing in a kiln to fuse and sinter the individual primary particles together to form the final ceramic article However, the preparation of the ceramic particulate mixture by spray-drying requires a lot of energy to dry the aqueous slurry. Attempts to reduce this energy requirement have led to the development of non-spray-drying processes to prepare the ceramic particulate mixture, such as dry granulation processes. These dry granulation processes avoid the need to form an aqueous slurry and, therefore, use much lower amounts of water than the traditional spray-drying processes. Consequently, these dry-granulation processes use less energy compared to spray-drying, by avoiding the need to evaporate off the excess water that is required to form an aqueous slurry.

One of the problems of non-spray-dried dry-granulated ceramic particulate mixtures is poor flowability. It is beneficial for the non-spray-dried dry-granulated ceramic particulate mixture to have a good flowability for a number of reasons. For example, good flowability eases the transport of the non-spray-dried dry-granulated ceramic particulate mixture around plants, especially when being dosed out of hoppers. Good flowability is also important to help dose the non-spray-dried dry-granulated ceramic particulate mixture into a mould, for example a mould that is used to press the mixture into a tile. Good flowability helps the non-spray-dried dry-granulated ceramic particulate mixture be spread uniformly throughout the mould. This is very important when making shapes such as floor tiles. Such ceramic articles are often large, with lengths and breadths of more than 50 cm but also having a thickness of less than 1 cm. This means that the ceramic mixture used to make such tiles needs to be uniformly spread throughout the mould, otherwise parts of the mould which are underfilled may not be compressed sufficiently and may cause the green article tile to break or have other defects during processing. Good flowability is essential to ensure easy dosing of the ceramic mixture into the mould and to ensure that the mixture can be easily and uniformly spread throughout the mould. An uneven distribution of particulate mixture in the mould results in the formation of a ceramic article that has different densities throughout the article. This may cause the article to develop defects during processing. Good flowability is essential to ensure easy and accurate dosing of the ceramic mixture into the mould, such as good flow about of a storage hopper. Good flowability also ensures that the mixture can be easily and uniformly spread throughout the mould.

The present invention overcomes this problem by providing a non-spray-drying, dry-granulation process for making a ceramic particulate mixture. The ceramic particulate mixture has a very tightly defined water level and particle size distribution, which leads to a good flowability profile. The process of the present invention comprises the steps of compacting and crushing followed by at least two specific air classification steps to produce the non-spray-dried dry-granulated ceramic particulate mixture. The process of the present invention is able to produce a non-spray-dried dry-granulated ceramic particulate mixture having the very specific water level and very tight particle size distribution that leads to a good flowability profile and processability. In addition, the process of the present invention has a good energy profile, for example having a reduced energy intensity.

The specific air classification steps are essential to the present invention. Sieving to remove oversized particles and fines is not practical on a commercial scale for this particle size distribution. Screens suitable for removing fines are easily blinded due to their small size and the cohesive nature of such fines. Even the upper particle size is difficult to remove by sieving without high levels of desired product being removed due to the inefficiency of sieving. Removing fines could be attempted in a fluidised bed, but this then requires a filter unit to recover the fines, which is capital intensive and burdensome.

The present invention requires at least two air classification steps, large particle elimination, preferably by a gravitational air classification step, and fine particle elimination, preferably by and a centrifugal air classification step. Preferably, the large particle elimination occurs before the fine particle elimination.

Gravitational air classification is typically used for separating larger particles (e.g. >600 µm or 0.500 µm) from smaller particles (e.g. 1-600 µm or 1-500 µm). Centrifugal air classification is typically used for separating larger particles (e.g. 80-600 µm, or 100-600 µm, or 80-500 µm, or even 100-500 µm) from smaller particles (e.g. <80 µm, or <100 µm). These separate air classification steps can occur in separate machines or can occur within the same machine.

If desired, the present invention also enables the incorporation of high levels of recycled material, such as recycled aluminium silicate material, and especially recycled aluminium silicate material derived from coal combustion fly ash, into the ceramic particulate mixture. However, the inclusion of the recycled aluminium silicate material in the dry granulation process can lead the dry-granulated ceramic particulate mixture to have even poorer flowability. These problems are exacerbated with the inclusion of increasing levels of recycled aluminium silicate material.

Without wishing to be bound by theory, the inventors believe that the recycled aluminium silicate material, and especially recycled aluminium silicate material derived from coal combustion fly ash, differ from other ceramic raw material ingredients such as clays and feldspars. Recycled aluminium silicate tends to be in the form of smooth glassy spheres, whereas clays and feldspars tend to be in the form of highly irregular shaped particles. The difference in particle shapes between the recycled aluminium silicate material and the other ceramic raw material ingredients such as clays and/or feldspars make it difficult to form a homogenous particulate mixture during a dry granulation process. For example, the smooth glassy spheres of recycled aluminium silicate material are not susceptible to the particle: particle interlocking mechanisms that can help bind the irregular shaped particles of the clays and/or feldspars together during dry granulation processes, such as roller compaction. This can result in issues such as recued robustness and an increased level of fine precursor material that has not been incorporated into larger particles. This increased heterogeneity of the resultant dry-granulated ceramic particulate mixture results in poor flowability, and other quality issues which lead to the poor visual appearance of the resultant ceramic article.

The process of the present invention enables recycled material such as recycled aluminium silicate material, and especially recycled aluminium silicate material derived from coal combustion fly ash, to be incorporated into the non-spray-dried dry-granulated ceramic particulate mixture, and which produces a mixture that has a good flowability.

The successful production of ceramic articles, such as porcelain floor tiles, from ceramic particulate mixtures containing significant levels of recycled aluminium silicate material therefore requires a balance of differing quality requirements which can be achieved by careful control of the particle size range and moisture level of the ceramic particulate mixture. It is also necessary to have a production process that can produce the required ceramic particulate mix.

US2016/053162 relates to granulates made by spray-drying, having sizes in the range of from 40 to 70 mesh.

US2007/059528 relates to a kaolin clay that is formed into granulates with a grain fineness number of from 57 to 85.

U.S. Pat. No. 5,028,569 relates to ceramic granulates containing roughly one third of aluminium silicate material.

CN 101 705 076 & database WPI, week 201042, Thomson Scientific, London GB relate to a method in which a ceramic material is pulverised and then air classified to a size of from 5 to 200 microns.

Database Inspec, the institution of electrical engineers, Stevenage, GB, April 1973, Spray A W et al; "particle size classification of ceramic powders", database accession no. 587796, & 75$^{th}$ annual meeting and exposition of the American ceramic society, vol. 52, no. 4, page 394 relate to the classification of ceramic powder to desired particle sizes by centrifugal air classification.

CN 108 046 752 relates to a dry granulation process for making clay granules having a moisture content of from 6 to 7 wt % an a size of from 200 to 300 mesh.

SUMMARY OF THE INVENTION

The present invention relates to a non-spray-drying, dry-granulation process for making a ceramic particulate mixture comprising from 4 wt % to 9 wt % water, wherein at least 90 wt % of the particles have a particle size of from 80 μm to 600 μm, wherein the process comprises the steps of:
(a) forming a precursor material;
(b) subjecting the precursor material to a compaction step to form a compacted precursor material;
(c) subjecting the compacted precursor material to a crushing step to form a crushed precursor material; and
(d) subjecting the crushed precursor material to at least two air classification steps, wherein one air classification step removes at least a portion of the particles having a particle size of greater than 600 μm from the crushed precursor material, and wherein the other air classification step removes at least a portion of the particles having a particle size of less than 80 μm from the crushed precursor material.

DETAILED DESCRIPTION OF THE INVENTION

Process for Making the Ceramic Particulate Mixture

The process for making the ceramic particulate mixture comprises the steps of:
(a) forming a precursor material;
(b) subjecting the precursor material to a compaction step to form a compacted precursor material;
(c) subjecting the compacted precursor material to a crushing step to form a crushed precursor material; and
(d) subjecting the crushed precursor material to at least two air classification steps to form the mixture according to any preceding claim.

The process does not comprise a spray-drying step.

Typically, the process does not comprise a wet agglomeration step.

Step (a) Forming the Precursor Material

The precursor material is typically formed by dry-milling and blending the ingredients of a ceramic body composition, such as clays, feldspars, glasses, fluxing agents and recycled materials. Any recycled materials, such as recycled aluminium silicate, especially recycled aluminium silicate derived from coal combustion ash, may also need to be milled and may need to be blended with the other ingredients to form the precursor material. The ingredients can be milled and classified separately or can be co-milled. This forms a fine, dusty and cohesive powder blend that is a suitable precursor material. Any suitable comminution equipment and classification equipment can be used, for example rod mills, including vibration rod mills, air classifier mills and impact mills. The Hosokawa Mikro ACM series of mills would be suitable. Another suitable mill is a MBE Palla vibration rod mill. A suitable air classifier would be the Mikro series air classifiers, also from Hosokawa Micron, especially if a mill without an internal classification system is chosen.

The precursor material may need to be humidified to make it plastic enough to be formed into a green article. This is typically done in a high-speed mixer where water is dispersed uniformly throughout the powder blend by the action of tools rotating at high speed. Suitable equipment for the humidification step would be the Schugi Flexomixer series from Hosokawa Bepex.

Typically, for a dry granulation process, the precursor material formed in step (a) comprises less than 10 wt % water. Preferably, the precursor material formed in step (a) comprises less than 10 wt % water. By contrast, typical wet granulation processes form precursor material comprising at least 10 wt % water.

Step (b) Compacting the Precursor Material

The precursor material is then typically fed between two closely spaced counter-rotating rollers which are pressed together with a defined and controlled force to exert sufficient pressure on the precursor material to form larger granules. The rollers can have smooth surfaces, and may have a textured pattern to help draw powder into the compression zone and to form the compacted material into pre-formed shapes. Suitable roller-compaction equipment to compact the precursor material includes the Kompactor MS85 from Hosokawa Alpine. Another suitable compactor would be the GF-360 from the Jiangyin Shengling Machinery Manufacturing Company Ltd. A person skilled in the art will be easily able to select the right combination of powder feed rates, pressures and other operating parameters depending on specific requirements.

The compacted precursor material coming from the compaction step can be in a variety of shapes and sizes, for example depending on the shapes of the rollers used. The compacted precursor material can be in the form of strips or briquettes or smaller fragments of strips depending on the roller profile used. However, whilst the material has now been formed into solid structures, the range of sizes and shapes of these solid structures will be quite unsuitable for further processing into ceramic articles and additional crushing and size classification processes will be necessary. These subsequent operations may be integrated into one unit, but they may also be done in separate units. This may offer increased flexibility in the classification processes.

Step (c) Crushing the Compacted Precursor Material

The solid structures and particles of compacted precursor material formed in step (b) will often contain a high proportion of material which is not of a suitable size and shape for forming into the ceramic particle mixture. The larger compacts, such as strips or briquettes and fragments coming from the roller compactor may need to be crushed. Crushing includes crumbling and breaking up larger fragments into smaller fragments. Typically, this needs to be done in a controlled manner to avoid excessive breakage of larger particles, generation of excessive fines and the undesired further comminution of the primary particles. Suitable equipment includes a Bepex BM25, and one skilled in the art could determine a suitable speed to optimise the size range of the granules coming from the crusher.

Preferably in step (c), no comminution occurs.

Step (d) Air Classification Step

The crushed precursor material undergoes at least two air classification steps.

The crushed precursor material is subjected to at least two air classification steps, wherein one air classification step removes at least a portion of the particles having a particle size of greater than 600 μm, or preferably greater than 500 μm, from the crushed precursor material, and wherein the other air classification step removes at least a portion of the particles having a particle size of less than 80 μm, or preferably less than 100 μm, from the crushed precursor material.

Preferably the crushed precursor material is subjected to a gravitational air classification step and a centrifugal air classification step.

Preferably, the crushed precursor material undergoes a gravitational air classification step followed by a centrifugal air classification step. This combination of two air classification steps provides optimum capability to classify the powders with a wide range of particle sizes to give the required particle size distribution of the ceramic particulate mixture.

The air classification steps may be integrated into one unit or in separate units. Typically, the crushed precursor material is fed into the gravitational air classification step as a first step to remove the largest oversize fragments. The large oversize fragments may be returned to the crusher. Gravitational separation is well suited to removing smaller fractions from oversize particles, and typically, the air classification system works by first removing the smaller fraction from the oversize fraction and then removing the fines from this smaller size fraction.

The size of the coarse and fine fractions can be determined by the operation of the classifier. A typical example is the Micron Separator Air Classifier from Hosokawa Micron. Another example is the C-Series from International Innovative Technologies Ltd (now Hosokawa Micron). A preferred type of classifier is a mechanical classifier which has a rotor to assist separation. However, other types of classifiers with no mechanical parts, such as cyclones, can also be used.

A mechanical classifier is able to classify particles by utilising the centrifugal force exerted on particles by the rotation of the rotor to oppose the centripetal force exerted on particles by the inward flow of air. Material to be separated is pneumatically conveyed into the inlet duct and up to the rotor, where the two opposing forces classify it. Finer particles are more susceptible to centripetal forces exerted by the airflow moving towards the exit located just above the centre of the rotor. They will be therefor be removed by the airflow, whereas coarse particles are more prone to the centrifugal force from the rotor and flung out to the side. These forces flow coarse materials down the inside wall of the machine, emptying out the materials in the coarse particle discharge, while finer particles travel through the air current into the rotor and then discharged through the upper outlet duct. By changing the rotational speed of the internal rotor, the size of the coarse and fine cuts can be easily adjusted. Increasing the speed of the rotor will reduce the size of the fines being removed. However, it can be necessary to avoid excessive break-up of larger particles in the rotor section of the classifier if this is not desired.

Gravitational Air Classification Step

Preferably, crushed precursor material undergoes a gravitational air classification step to remove at least a portion of the particles having a particle size of greater than 600 μm, or preferably greater than 500 μm, from the crushed precursor material, and wherein the removed particles may be recycled back to the crusher in step (c).

Typically, a gravitational air classifier, works by feeding the incoming powder as a falling sheet through which an air stream is passed. Vanes are often used to cause a change in the direction of the air flow and enhance the gravitational separation of larger particles which are too heavy to be elutriated and carried away. These are then discharged at the bottom of the unit. Gravitational air separators are able to remove larger particles more efficiently than sieving with screens could do, especially with materials like the crushed precursor material that tend to be cohesive, have excessive amounts of fines, and which could block the screens. A size cut of 600 μm, or preferably 500 μm, is too fine for sieving to be viable on a large-scale production. Suitable gravitational separators are supplied by Metso Minerals Industries, Inc of Pennsylvania, United States.

One skilled in the art can select air flows and feed rates, etc to get the desired size cut.

Centrifugal Air Classification Step

Preferably, the crushed precursor material undergoes a centrifugal air classification step to remove at least a portion of the particles having a particle size of less than 80 μm, or preferably less than 100 μm, from the crushed precursor material, and wherein the removed particles may be recycled back to the compactor in step (b). This is especially preferred when the crushed precursor material also undergoes the gravitational air classification step to remove at least a portion of the particles having a particle size of greater than 600 μm, or preferably greater than 500 μm, from the crushed precursor material, and wherein the removed particles from the gravitational air classification step are recycled back to the crusher in step (c).

The gravitational separation step preferably precedes the centrifugal separation step as the presence of large fragments, as well as fines in the feed stream to the centrifugal air separator, could easily cause material build-up on the inside of the equipment and increased wear on the rejector blades due to particle-blade impacts.

Centrifugal air classifiers work by subjecting the powder mix to a combination of centrifugal force, which throws the feed material towards the outer casing of the classifier, and drag from the air flow, which draws particles towards an exit in the top of the centre of the rotor section. The centrifugal force is generated by the rotation of rotor blades (the rejector blades) and changes in the speed of the rotors can be used to alter the centrifugal force and hence the size of particles which are entrained by the air flow and removed as fines. One skilled in the art would be able to adjust the rotor speed to give the desired size cut whilst taking into account the feedrates and the airflows used to entrain the incoming feed material. Suitable centrifugal classifiers are the Micron Separator Air Classifiers made by Hosokawa Micron.

Precursor Material

The precursor material is typically a blend of ceramic ingredients that have been milled, classified, blended and then optionally humidified. Suitable ceramic ingredients include: recycled aluminium silicate material, typically at levels of from 20 wt % to 80 wt %; clays, especially bentonite clays, typically from 10 wt % to 50 wt %; feldspars, typically from 4 wt % to 50 wt %; and optionally other additives, such as fluxing materials, typically from 0 wt % to 10 wt %, or from 1 wt % to 10 wt %. A person skilled in the art will know different suitable ceramic body compositions.

Compacted Precursor Material

The compacted precursor material can range in size from particles to solid structures, e.g. strips, of up to several centimetres, or even larger, in size. The compacted precursor material can range from lightly compacted material to highly compacted material. The compacted precursor material may also be a material that has regions that are highly compacted and regions that are lightly compacted.

Crushed Precursor Material

Typically, the crushed precursor material has a particle size distribution such that at least 20 wt % of the particles are less than 63 μm.

Typically, the crushed precursor material is not subjected to a sieving step.

Process for Making a Ceramic Article

The process for making a ceramic article comprises the steps of:
(e) pressing a ceramic particulate mixture obtained by the process described above, to form a green article;
(f) optionally, subjecting the green article to an initial heat treatment step;
(g) subjecting the green article to a heat treatment step in a kiln to form a hot fused article; and
(h) cooling the hot fused article to form a ceramic article.

It might be preferred for steps (e), (f) and (g) to be continuous process steps. In this manner, the process is efficiently optimized.

Step (h) can be a continuous process step, together with steps (e), (f) and (g). Alternatively, step (h) can be a batch step.

Typically, the optional step (f) dries the green article before the heat treatment step (g).

The process may optionally include additional process steps, such as sieving or dusting or further humidification, after the air classification steps if further controls are required.

Optional Humidification Step

The precursor material may be humidified. The added water increases the plasticity of the mix and helps the compaction of the mixture to form the compacted body of the tile. The humidification of the precursor material increases the strength of the pressed tile prior to firing. However, usually it is very important to carefully control both the level of water added and the dispersion of the water in the mixture. For example, if the level of water is too high, then the green article can crack during drying due to the escape of steam from within the body. The handleability, processability and/or homogeneity of the particulate mixture may also be negatively impacted by high water levels. High levels of water added to make the forming and pressing steps easier may make the drying step more difficult and prone to generating defects. If the water level is not high enough, the humidified mixture may not be sufficiently deformable to be compressed into the desired shape with sufficient green strength. Hence the water level is typically a balance between different requirements and needs to be carefully controlled.

Typically, the water added to the precursor material needs to be well dispersed throughout the mixture if it is to be effective at increasing the plasticity of the precursor material. If the water is not well-dispersed throughout the precursor material, the material may contain a mixture of over-wetted agglomerates and non-wetted material. This type of mixture would usually behave very poorly during pressing with multiple defects, especially in regions of the green article where the mixture was too dry to be successfully compacted to a robust structure.

To ensure a high level of dispersion, the water is normally added to the precursor material in a high-shear mixer after the dry-milling step and before the dry granulation process. Suitable mixers for this include the Schugi Flexomix series from Hosokawa Micron.

Step (e) Pressing the Ceramic Particulate Mixture

The ceramic particulate mixture is described in more detail above.

Prior to pressing the ceramic particulate mixture in step (e), the ceramic particulate mixture may have been humidified. This optional humidification step is described in more detail above.

Preferably, the ceramic particulate mixture is obtained by process steps (a)-(d) described in more detail above. If process steps (a)-(d) are used to obtain the mixture, then any humidification step may not be needed. This is because the water level of the mixture can be controlled very well by process steps (a)-(d), such that the target moisture level of the mixture can be obtained without the need for any additional humidification step.

The ceramic particulate mixture is typically fed into a mould prior to pressing. The amounts of material added to each mould may need to be controlled to be at the target quantity and uniformly spread over the area of the mould. If this does not happen, then parts of the tile may experience different forces during pressing and this will increase the chance of defects. Specialised particulate mixture feeders, such as the DCP 160 from SACMI of Imola, Italy, can be used to ensure uniform dosing into the moulds and that the powder bed is flat and of uniform thickness. The humidified mixture is then typically compressed in a press at pressures between 15 and 50 MPa to form the green article depending on the particulate mixture composition and properties. Suitable presses include the IMOLA series of hydraulic presses also supplied by SACMI. A person skilled in the art will be easily able to select the right combination of powder feeder and press depending on specific requirements.

Step (f) Optional Initial Heat Treatment Step

The green article can optionally be subjected to an initial heating step to at least partially dry, or dry, the green article prior to firing in the kiln. This step can be separate to, or integrated with, the firing in the kiln. Temperatures during this initial drying step typically do not exceed 110° C. so as to avoid cracking.

Optionally Glazing the Green Article

Prior to the typical high temperature firing step, the article can be glazed. Typically, glazing applies a layer or layers of material which becomes vitrified during the firing cycle to form a thin vitreous layer which is bonded to the surface of the ceramic article. Typically, this vitreous layer forms an impervious barrier on the surface of the tile and can incorporate coloured minerals or pigments to allow decorative patterns, colours and images to be incorporated into the vitreous layer. Glazing can be applied in one step or in multiple steps and prior to firing or after a firing step. In multistep glazing processes, for example to make complex "bicuttura" tiles, a first glaze composition is applied to the surface of the article which is then fired to form a first vitreous layer. Typically, the partially glazed article is then cooled and a further glaze is then applied and the article re-fired. This can be repeated as needed. Such a process can be used to make high complex and decorative glaze patterns and images but tends to reduce the strength of the article. For example, bicuttura tiles are generally not strong enough to be used as floor tiles.

A process that applies the glaze to the unfired article and then fires the glazed article in one step generally produces a higher strength article. Such processes are typically used to make monocuttura tiles, for example, which are robust enough to be used as floor tiles. Hence it is preferred that a single step glazing and firing process is used to make glazed ceramic articles such as floor tiles.

The glaze can be applied as an aqueous suspension of very finely ground minerals and pigments, especially metal oxides, or as a fine powder. Preferably the glaze or glazes are applied as an aqueous suspension as this permits images or decorative patterns to be painted onto or printed onto the surface of the article. It is possible to use high-speed ink jet type printers to print very high-quality images onto the surface of the ceramic article and for such images to be retained in the glaze layer after firing. Typically, it is necessary to precisely control the composition and properties of the glazes used. For example, the viscosity of a molten glaze material needs to be high enough that the glaze does not run off the surface of the article during firing or colours diffuse together to produce a blurred and low-quality image. Typically, the properties of the glaze or glazes need to be fully compatible with the ceramic article, for example to avoid cracks forming in the glaze due to differential shrinkage during the firing cycle.

Typically, aqueous suspension glazes are made by combining different minerals, pigments and other materials such as fluxes in a slurry and subjecting the slurry to extended grinding to form very fine solid particles. Such glazes can take many hours of grinding to prepare. If they are insufficiently ground then they can be harder to apply, for example using ink-jet technology, and the consistency and uniformity of the glazed layer is compromised. There is very extensive knowledge and experience in the field of glazing and printing of ceramics, and one skilled in the art would be able to select and prepare glazes depending on need. Companies such as EFI supply suitable "ceramic inks" which are coloured glazes that can be used for printing. EFI supplies "Cretaprint" inks for ceramic tile printing. A modern ceramic tile printer, such as the Cretaprint P4 from the Cretaprint series made by EFI, will apply multiple inks and finishes using multiple spray bars as the green tile passes through the printer to build up the final image and glaze layer. Cretaprint ceramic inks and finishes and the Cretaprint P4 would be suitable for applying a glaze layer to articles made using the particulate mixture described above.

Step (g) Heat Treatment Step

Typically, the green article is fired in a kiln to cause sintering of the particles of the particulate ceramic mixture and result in a high strength vitrified structure.

This firing step can be done in a batch kiln or a continuous kiln, preferably a continuous step is used. Industrially, "tunnel kilns" are most important. Typically, in such kilns, the ceramic article is slowly moved through the length of a long heated-tunnel. Typically, the temperatures of the different zones in the kiln are kept constant and the article is moved through these zones. In this way, the conditions experienced by the ceramic article can be very precisely controlled and the entire heating and cooling cycle can take less than two hours, compared to the very extended times required for large batch kilns. Typically, the hottest part of such a tunnel kiln is the central zone and the temperatures experienced by the ceramic article are gradually increased and then decreased. This minimises quality issues: for example, cracks forming due to stresses forming during the heating or the cooling process. Often, if cooling is too rapid, internal stresses develop within the body of the tile causing warping or fracture. The gradual, and controlled, heating profile also allows for impurities, such as carbon, to be "burnt out" in a controlled manner such that any gases escape through the pores without causing issues such as "bloating". Typically, the heating of the tunnel kiln can be achieved by use of gas burners or electrical heaters or microwave heating and combinations thereof. The use of gas burners for heating in a tunnel kiln will often mean that the atmosphere inside the kiln is low in oxygen and this will impact on the chemical changes happening within the glaze and article.

The temperature profile throughout the length of the kiln is typically determined by the composition of the ceramic particulate mixture. Different materials will melt or begin to sinter at different temperatures. For example, materials described as "fluxes" will cause the ceramic body to melt at lower temperatures than other materials. For example, materials described as "fluxes" will have a lower melting point then the other materials. The sintering behaviour is also typically determined by the particle size of the particulate mixture as large particles have slower kinetics of sintering compared to smaller particles. Typically, a concern is to avoid such high temperatures that an excessive amount of the mixture melts during firing. This can cause a loss of strength and a phenomenon known as "slumping" where the ceramic article does not have the internal strength to retain its shape and hence becomes deformed.

A typical kiln for ceramic article manufacture, for example ceramic tile manufacture, will have a maximum temperature of between 1000° C. and 1250° C. in the central zone of the kiln. The maximum temperature can be dependent on the exact composition of the mixture. Mixtures with higher levels of fluxes typically need a lower maximum temperature. Mixtures with larger particles typically need a longer time at the highest temperature due to the slower kinetics of sintering. The temperature profile along the length of the kiln can be varied to create specific structures and mineral phases within the fired article. The entire cycle of heating and cooling will typically take less than one hour.

One issue with most kilns is that the thermal inertia of the kiln is large, and conditions cannot be quickly changed. Large industrial kilns can require days for cooling. Hence it is not possible to quickly adjust kiln conditions to compensate for changes in the properties of the particulate mixture used to make the ceramic article and other methods have to be used.

The article described above could be fired to form a final ceramic tile by heating the green article in a steadily increasing manner from ambient to about 1250° C. over a 20 minute period and then maintaining that temperature for between 3 and 10 minutes followed by reducing the temperature in a continuous manner over a 30 minute period back to ambient.

Step (h) Cooling Step

The hot fused article is typically cooled. Typically, gradual cooling of the article, such as a ceramic tile is often beneficial to avoid defects from internal stresses and some manufacturers may stack the hot tiles coming from the kiln and leave them for several hours to go through a very gradual cooling step to ambient conditions. Typically, compositions and processes that enable an increased rate of cooling without issues are beneficial for increased production rates.

Ceramic Article

Preferably, the ceramic article is a ceramic tile, preferably a ceramic porcelain floor tile. The ceramic tile can have a thickness of less than 1 cm, a width of at least 20 cm, preferably at least 30 cm, and a length of at least 20 cm, preferably at least 30 cm. The ceramic article can be a glazed ceramic article, such as a glazed ceramic tile, preferably a glazed ceramic porcelain floor tile.

Green Article

Typically, the green article made from the ceramic particulate mixture needs to have sufficient mechanical strength such that it can be handled and transported to the kiln and/or the optional glazing unit without breaking. This is referred to as the "green strength". Typically, the green strength needed depends on the shape and dimensions of the green article and the handling operations it has to undergo. Typically, the green strength depends on the composition of the particulate mixture and materials such as water, polymers and high plasticity clays that can be added to the particulate mixture to increase the green strength to allow handling.

Glaze

Glazes are typically aqueous suspensions of finely micronized minerals, pigments and other materials such as fluxes and film formers. Typically, they are prepared by the extended grinding of slurries to form aqueous suspensions. The exact composition of a glaze is typically determined by the required properties and can be selected by one skilled in the art.

Glazed Green Article

Typically, the glazed green article is a green article that has been glazed. Preferably, the glazed green article is a dried green article that has been glazed.

Ceramic Particulate Mixture

Typically, the particulate mixture is suitable for use in ceramic article production. A ceramic article production process is described in more detail below.

The ceramic particulate mixture may comprise at least 20 wt % recycled aluminium silicate material. Typically, the mixture comprises from 20 wt % to 80 wt % recycled aluminium silicate material. Typically, the mixture comprises from 40 wt % to 80 wt % recycled aluminium silicate material. Typically, the mixture comprises from greater than 50 wt % to 80 wt % recycled aluminium silicate material. The mixture may comprise from 60 wt % to 80 wt %, or even from 70 wt % to 80 wt % recycled aluminium silicate material. The recycled aluminium silicate material is described in more detail below. Higher amounts of recycled aluminium silicate material present in the ceramic particulate mixture exacerbate the problems discussed in the background to the invention.

The ceramic particulate mixture comprises from 4 wt % to 9 wt % water, preferably from 4 wt % to 8 wt % water, or preferably from 5 wt % to 8 wt % water.

The particulate mixture may comprise from 20% to 70 wt %, or from 20 wt % to 50 wt % or less, or from 20 wt % to 40 wt %, or from 20 wt % to 30 wt % material selected from clay, shale, feldspar, glass and any combination thereof. A preferred material is a combination of clay and feldspar. A suitable clay is a standard clay such as Ukrainian clay. A preferred clay is a combination of standard clay and high plasticity clay. The weight ratio of standard clay to high plasticity clay may in the range of from 2:1 to 5:1. A suitable clay is a high plasticity clay such as bentonite clay. Typically, a high plasticity clay has an Attterburg Plasticity Index of greater than 25.0. Typically, a standard clay has an Atterburg Plasticity Index of 25.0 or less. The amount of high plasticity clay can be selected to provide sufficient robustness and flowability for ceramic particulate mixtures, especially ceramic particulate mixtures that comprise recycled aluminium silicate material.

The particulate mixture may comprise a binder, typically from 0.1 wt % to 3.0 wt % binder, or from 0.5 wt % to 2.0 wt % binder. Suitable binders are described in more detail below. Typically, the incorporation of binder into the particulate mixture imparts sufficient strength to the resultant green article which is formed from the particulate mixture, for example by pressing, during a ceramic production process.

Preferably, the particulate mixture comprises less than 5.0 wt % calcium oxide.

Due to the dry-granulation process negating the need for any deflocculant, the ceramic particulate mixture produced by the dry-granulation process typically does not comprise any deflocculant.

The ceramic particulate mixture has a particle size distribution such that at least 90 wt % of the particles have a particle size of from 80 μm to 600 μm. Preferably, at least 95 wt %, or at least 99 wt % of the particles have a particle size of from 80 μm to 600 μm. Preferably, at least 90 wt %, or at least 95 wt %, or even at least 99 wt % of the particles have a particle size of from 100 μm to 500 μm. Preferably, substantially all of the particles have a particle size of from 80 μm to 600 μm. Preferably, substantially all of the particles have a particle size of from 100 μm to 500 μm.

The particle size distribution of the particulate mixture can be controlled by classification. Separation of particulate mixtures into a coarse fraction (or cut) and a fine fraction (or cut) is conveniently done by air classification when there are smaller particles which would blind the screens used in mechanical sieves. The size of the coarse and fine fractions can be determined by the operation of the classifier. A typical example is the Micron Separator Air Classifier from Hosokawa Micron. The machinery is able to classify particles by balancing the centrifugal force of the rotor and the centripetal force of the air. Material to be separated is pulled through by the fan into the inlet duct and up to the rotor, where the two opposing forces classify it. Finer particles are more susceptible to centripetal forces whereas coarse particles are more prone to centrifugal force. These forces flow coarse materials down the inside wall of the machine, emptying out the materials in the coarse particle discharge, while finer particles travel through the air current into the rotor and then discharged through the upper outlet duct. By changing the rotational speed of the internal rotor, the size of the coarse and fine cuts can be easily adjusted. Increasing the speed of the rotor will increase the size of the split between the coarse and fine fractions.

Typically, the mixture has a bulk density of at least 800 g/l.

Typically, the mixture has a flowability of less than 10 s/l, or less than 8 s/l.

Typically, the mixture is not spray-dried.

Recycled Aluminium Silicate Material

Typically, the optional recycled aluminium silicate material is derived from coal combustion products.

Typically, the recycled aluminium silicate material is obtained by subjecting the coal combustion products, such as ash, to a beneficiation process. The recycled aluminium silicate is typically beneficiated fly ash. It may be preferred for the recycled aluminium silicate to be beneficiated fly ash derived from class F fly ash.

Typically, the recycled aluminium silicate material is obtained by subjecting the coal combustion products, such as ash, to an initial particle size screen (such as a 1 mm screen) to remove any large objects, and then to one or more smaller particle size screens (such as 250 μm and/or 125 μm) to remove large particles. This screened material is then typically subjected to a magnetic separation step to reduce the iron oxide content. This magnetic separation step can involve a first magnetic separation step, for example at a gauss of 8,000 or around 8,000, followed by a second magnetic separation step, for example at a gauss of 30,000, or around 30,000. Alternatively, only one magnetic separation step may be used, for example at a gauss of 8,000 or around 8,000. This material is then typically subjected to a carbon reduction step, such as calcination or flotation, preferably calcination. The material may also be subjected to an electrostatic separation technique.

The recycled aluminium silicate material is typically predominately aluminium silicate. The recycled aluminium silicate typically comprises combustible carbon and iron oxide; and may additionally comprise trace amounts of other materials such as sodium salts and/or magnesium salts, and metal oxides other than iron oxide. The recycled aluminium silicate material typically comprises at least 88 wt % aluminium silicate, preferably at least 90 wt % aluminium silicate. Depending on the levels of the combustible carbon and iron oxide, the recycled aluminium silicate may even comprise at least 92 wt %, or at least 94 wt %, or at least 96 wt %, or even at least 98 wt % aluminium silicate.

The recycled aluminium silicate material may comprise from 0.5 wt % to 8.0 wt %, or from 1.0 wt % to 8.0 wt %, or from 1.0 wt % to 7.0 wt %, or from 1.0 wt % to 6.0 wt %, or from 1.0 wt % to 5.0 wt %, or from 1.0 wt % to 4.0 wt %, or from 1.0 wt % to 3.0 wt % combustible carbon.

One preferred recycled aluminium silicate material is obtained by removing all of the combustible carbon from the coal combustion product, and then adding combustible carbon back to this nil-combustible carbon material. In this way, the level of combustible carbon present in the recycled aluminium silicate material can be carefully, and tightly, controlled.

The level of combustible carbon present in the recycled aluminium silicate material can be controlled, typically reduced, by techniques such as calcination, electrostatic removal, and flotation techniques such as froth-air flotation techniques.

Such processes for controlling the level of combustible carbon are well described in the art.

Suitable equipment for calcinating materials to reduce carbon levels include the Staged Turbulent Air Reactors supplied by SEFA Group of Lexington, South Carolina. These reactors heat incoming ash to further burn out the residual carbon.

Another well used technique is triboelectrostatic separation whereby carbon particles can be removed from the bulk ash material, especially after comminution, by passing through an electrostatic separator. The carbon particles can be charged to have an opposite charge to the non-carbon particles and can then be removed by passing the ash material through an electrostatic separator. Suitable equipment for this include the STET separators supplied by ST Equipment and Technologies LLC of Needham, Massachusetts.

Suitable froth flotation equipment includes the Dorr-Oliver and Wemco units supplied by FLSmidth.

These processes can all reduce excessively high carbon levels. In calcination processes, increasing the operating temperatures will further reduce the carbon levels. In electrostatic separation, increasing the voltages used in the separation units, and increasing the degree of comminution of the material entering the separator, can be used to further reduce the carbon levels.

In froth flotation processes, increasing the degree of milling of the incoming material to further release unburnt carbon particles, increasing the amount of air used and using additives such as surfactants, can all be used to control the reduction in the levels of carbon.

Carbon levels can be increased by the addition of finely-ground combustible carbon-rich materials into the particulate mixture. It may be especially preferable to add any combustible carbon-rich material into any comminution steps involved in the preparation of the particulate mixture. It is also preferred if the combustible carbon-rich material is that material previously extracted from combustible carbon-rich ash. This maximises efficiency. Other sources, such as ground coal and/or coal shale, can certainly be used. Preferably, the particle size of the combustible carbon-rich material in the particulate mixture is comparable to the particle sizes of the other materials present in the particulate mixture.

The recycled aluminium silicate material may comprise from 0.5 wt % to 12.0 wt %, or from 0.5 wt % to 11.0 wt %, or from 0.5 wt % to 10 wt %, or from 0.5 wt % to 9.0 wt %, or from 0.5 wt % to 8.0 wt %, or from 0.5 wt % to 7.0 wt %, or from 0.5 wt % to 6.0 wt %, or from 0.5 wt % to 5.0 wt %, or from 0.5 wt % to 4.0 wt %, or from 0.5 wt % to 3.0 wt %, or from 0.5 wt % to 2.0 wt % iron oxide.

One preferred recycled aluminium silicate material is obtained by removing all of the iron oxide from the coal combustion product, and then adding iron oxide back to this nil-iron oxide material. In this way, the level of iron oxide present in the recycled aluminium silicate material can be carefully, and tightly, controlled.

The iron oxide level in the recycled aluminium silicate is typically controlled by a process of detecting the iron oxide level in the particulate mixture and, if it is out of spec, then either increasing the amount of iron oxide removed from the recycled aluminium silicate or adding iron-oxide rich material into the aluminium silicate.

Iron oxide levels can be reduced by passing the recycled aluminium silicate through one or more magnetic separators. These apply a magnetic field to the passing stream of recycled aluminium silicate which allows magnetically-susceptible materials, such as iron oxide, to be removed from the bulk stream. Magnetic materials such as magnetite can be removed by using a lower intensity magnetic field of up to 10,000 Gauss (=1 Tesla). Less magnetically susceptible minerals such as hematite can also be extracted using magnetic separation but typically need a much high magnetic intensity field of up to 2 or 3 Tesla. Often magnetic separation processes will use a low intensity separation step followed by a high intensity separation step. Suitable equipment for extraction of iron oxide from recycled aluminium silicate includes the WDY range of magnetic separators made by the Foshan Wandaye Machinery Equipment Company Ltd of Foshan City, Guangdong, China. The model WD-7A-300 could be used. Magnetic separation could also be done on wet slurries but this is not a preferred route for treating recycled aluminium silicate due to the need for a secondary drying step.

The iron oxide level in the recycled aluminium silicate can be increased by the controlled addition of iron oxide rich material to the recycled aluminium silicate. Iron oxide minerals such as magnetite or hematite would be most preferable but other sources could be used. An especially preferred solution would be the re-utilisation of iron oxides removed from prior processing of recycled aluminium silicate with excessively high levels of iron oxide. Preferably, the iron oxide rich particles have a comparable size to the recycled aluminium silicate so as to ensure homogeneity. The iron-oxide rich material could be added to the recycled aluminium silicate prior to any mixing or milling steps to aid homogeneity.

Combustible Carbon

Typically, combustible carbon is carbon that can be measured by a loss on ignition (LOI) method. It is this combustible carbon that needs to be carefully controlled in the particulate mixture. The recycled aluminium silicate material may comprise non-combustible carbon such as non-combustible carbide, typically at very low levels (trace amounts).

Iron Oxide

Typically, the iron oxide content is measured by X-ray fluorescence spectrometry (XRF).

Binder

Suitable optional binders are organic binders. Suitable organic binders include polyvinyl alcohol, superplasticizers, methylcellulose, carbomethoxy cellulose, or dextrin. Other binders will be known to those skilled in the art. The organic binder may be in the form of a liquid.

One option to improve flowability and general robustness of ceramic particulate mixtures, especially ceramic particulate mixtures that comprise recycled aluminium silicate material, is to use binders, such as viscous polymers, to help bond the individual particles together. Alternatively, the ceramic particulate mixture may be free of binder. The ceramic particulate mixture may be free of viscous polymer binder. The ceramic particulate mixture may comprise no deliberately added binder. The ceramic particulate mixture may comprise no deliberately added viscous polymer binder. It can be hard to disperse such binders, especially viscous polymer binders, uniformly throughout a ceramic particulate mixture, especially when using dry granulation processes. In addition, the presence of such binders brings additional cost, complexity and can complicate subsequent processing. It may also be necessary to balance the flowability of ceramic particulate mixtures, especially ceramic particulate mixtures that comprise recycled aluminium silicate material, with the other physical properties required for processing.

Method of Measuring Particle Size

The particle size distribution is measured by laser diffraction. A suitable standard for size analysis by laser diffraction is given in ISO 13320:2009. Suitable size analysers are the Mastersizer 2000 and 3000 instruments by Malvern Instruments. It is preferred to disperse the samples by compressed air (usually with a Scirocco 2000 unit) where the material is tested as a powder stream, rather than the wet method where the test material is dispersed in a fluid first. However, it is possible to disperse and test these ceramic mixtures in non-aqueous liquids. The measurement is typically done as per the manufacturer's instruction manual and test procedures.

The results are typically expressed in accordance with ISO 9276-2.

Method of Measuring Bulk Density

Bulk density can be measured according to ISO 697-1981.

Method of Measuring Flowability

The flowability can be measured by timing the flow of 100 g of ceramic particulate mixture out of a modified Ford viscosity cup meeting ISO 2431:2011. The viscosity cup is modified such that the circular outlet orifice in now 10 mm rather than the 4 mm orifice commonly used in many liquid viscosity measurements. The orifice is closed, and the container filled with 100 g of powder. The orifice is then opened, and the time taken for the powder to fall through the orifice is measured.

Method of Measuring the Combustible Carbon Content

The level of combustible carbon is measured by the Loss on Ignition (LOI) test as per ASTM D7348. In this test, 1 g of fly ash is first dried at 110° C. to dry the sample. The sample is then cooled weighed. Then the sample is heated in a step wise manner over a two-hour period to reach 950° C.

Method of Measuring Iron Oxide Content

The level of iron oxide is measured by X-ray fluorescence. The typical particle size of the recycled aluminium silicate is sufficiently small that the technique is suitable for accurate measurement. The technique works by the excitation of the sample using high energy gamma or X-rays. This causes an ionisation of the atoms present which then emit characteristic frequency EM radiation which is dependent on the type of atom. Analysis of the intensity of different frequencies allows an elemental analysis to be made. Suitable equipment would be the Varta range of XRF analyzers supplied by Olympus. The equipment detects elemental iron and the result is most usually converted to the corresponding level of $Fe_2O_3$.

EXAMPLES

Forming the Precursor Material

Feldspar sand (containing 1.5% water), clay (containing 2.5% water) and recycled aluminium silicate derived from coal combustion fly ash (containing 0.1% water) are ground and blended in a comminution system at a weight ratio of 5/45/50.

The resultant mixture has the following composition (on a dry basis):

| Feldspar material | 4.925% | wt % |
|---|---|---|
| Clay | 43.875 | wt % |
| Recycled Aluminium Silicate | 49.95 | wt % |
| Water | 1.25 | wt % |

Following comminution, >99% by weight of the above composition had a particle size less than 75 μm.

The above composition is then fed to a vertical, high speed mixer, at a rate of 7000 kg/hr. The internal diameter of the mixer is 0.6 m and the height from inlet to outlet 1.2 m. The central shaft has four pairs of mixer blades and four pairs of nozzles mounted in a staggered manner uniformly along the length of the shaft. The vertical mixer is rotating at 2000 rpm and 235 kg/hr water is injected into the mixer through the nozzles to create a partially humidified mixture. The moisture level is checked on-line. The partially humidified mixture is then passed through a second, similar mixer operating at 2000 rpm, where a further 235 kg/hr of water is injected to form the humidified precursor material. The humidified precursor material is then coarsely sieved to remove large fragments of make-up. The amount of oversize that has to be removed is less than 1%.

The humidified precursor material has the following composition:

| Feldspar material | 4.6 | wt % |
|---|---|---|
| Clay | 41.1 | wt % |
| Recycled Aluminium Silicate | 46.8 | wt % |
| Water | 7.5 | wt % |

Compressing the Precursor Material

The precursor material is collected into a container and then fed at 300 kg/hr into a GF-360 roller compactor. The roller compactor is operating at a roller force of about 25 kN and a rotation speed of 30 rpm. The precursor material is compressed to form compressed precursor material and collected.

Crushing the Compressed Precursor Material

The collected, compressed precursor material is then fed into a TWLY-4 crusher, operating at 2000 rpm with a gap of 1.1 mm and at a rate of up to 15 t/hr where it is then crushed and broken up. The compressed precursor material is crushed to form crushed compressed precursor material (alternatively known as crushed precursor material). This material was found to have 28% greater than 600 microns and 21% less than 100 microns. This material is then collected in a super sack for classification.

This material "as is" often jams or does not flow out of the flowability test equipment at all. Removing the fraction of material >600 microns gives a flowability of ~45 s/100 g.

Air Classifying the Crushed Precursor Material

The crushed precursor material is then fed out of the super sack at a rate of 1 t/hr and pneumatically conveyed at a velocity of between 25 and 30 m/s into a modified C-Series air classifier. The C-Series air classifier is modified such that the larger particles from the centrifugal air classification step are not blended with the oversize from the gravitational air separator, as in the standard design of this equipment. Instead, the offtake from the centrifugal air classification step is the desired end-product. The rotor of the centrifugal air classifier is operated at a low speed to minimise particle break-up and to maximise the removal of material less than 100μ. About 25% of the crushed material is removed as fines and 23% as oversize.

The resulting finished product is a non-spray-dried, dry-granulated ceramic particulate mixture with 92 wt % having a particle size between 80 μm and 600 μm.

The bulk density of the non-spray-dried, dry-granulated ceramic particulate mixture is 1050 g/l.

The non-spray-dried, dry-granulated ceramic particulate mixture has a flowability of 9 s/100 g as measured by the method described herein.

Process of Making a Ceramic Article

The non-spray-dried, dry-granulated ceramic particulate mixture is then processed into ceramic tiles as follows:

The crushed compressed precursor material "as is" is made into a green article tile to demonstrate the effect of larger particles. 350 g is placed in a mould 11 cm by 23 cm and 2 cm deep. It is then pressed with a force of 7 tons to form a green ceramic article. The surface of the tile is noticeably rougher than a similar tile made with material meeting the inventive specification.

The tile made with the material meeting the inventive specification is then heated to a temperature of 200° C. over a period of 1 hr. This is then followed by a glazing step where a glaze is applied to the upper surface of the pressed article. The glazed green article is then subjected to a continuously ramped increase in temperature to 1200° C. during 1 hour, followed by 20 minutes at 1200° C. followed by a continuous decrease in temperature over 1 hour down to 90° C. This is then followed by a further 24 hours at ambient conditions to reduce the temperature to ambient.

The invention claimed is:

1. A non-spray-drying, dry-granulation process for making a ceramic particulate mixture comprising from 4 wt % to 9 wt % water, wherein at least 90 wt % of particles of the ceramic particulate mixture have a particle size of from 80 μm to 600 μm,
wherein the process comprises the steps of:
(a) forming a precursor material;
(b) subjecting the precursor material to a compaction step to form a compacted precursor material;
(c) subjecting the compacted precursor material to a crushing step to form a crushed precursor material; and
(d) subjecting the crushed precursor material to at least two air classification steps, wherein one air classification step removes at least a portion of the particles having a particle size of greater than 600 μm from the crushed precursor material, and wherein the other air classification step removes at least a portion of the particles having a particle size of less than 80 μm from the crushed precursor material.

2. A process according to claim 1, wherein the crushed precursor material undergoes a gravitational air classification step to remove at least a portion of the particles having a particle size of greater than 600 μm from the crushed precursor material, and wherein the crushed precursor material undergoes a centrifugal air classification step to remove at least a portion of the particles having a particle size of less than 80 μm from the crushed precursor material.

3. A process according to claim 2, wherein the crushed precursor material undergoes the gravitational air classification step followed by the centrifugal air classification step.

4. A process according to claim 1, wherein the crushed precursor material has a particle size distribution such that at least 20 wt % of the particles are less than 63 μm.

5. A process according to claim 1, wherein the crushed precursor material is not subjected to a sieving step.

6. A process according to claim 1, wherein at least 99 wt % of the ceramic particulate mixture has a particle size of from 80 μm to 600 μm.

7. A process according to claim 1, wherein at least 90 wt % of the ceramic particulate mixture has a particle size of from 100 μm to 500 μm.

8. A process according to claim 1, wherein at least 99 wt % of the ceramic particulate mixture has a particle size of from 100 μm to 500 μm.

9. A process according to claim 1, wherein the ceramic particulate mixture comprises at least 20 wt % recycled aluminium silicate material.

10. A process according to claim 1, wherein the ceramic particulate mixture has a bulk density of at least 800 g/l.

11. A process according to claim 1, wherein the ceramic particulate mixture has a flowability of less than 8 s/l.

* * * * *